US007676592B2

(12) United States Patent
Coffey

(10) Patent No.: US 7,676,592 B2
(45) Date of Patent: Mar. 9, 2010

(54) 10/100 MBS NETWORK DEVICE

(75) Inventor: Joseph Christopher Coffey, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1536 days.

(21) Appl. No.: 10/669,248

(22) Filed: Sep. 24, 2003

(65) Prior Publication Data
US 2005/0076129 A1     Apr. 7, 2005

(51) Int. Cl.
G06F 15/16    (2006.01)
(52) U.S. Cl. .................. 709/233; 709/230; 709/232
(58) Field of Classification Search .......... 709/230, 709/232–233
See application file for complete search history.

(56) References Cited
U.S. PATENT DOCUMENTS

| 5,357,510 | A | 10/1994 | Norizuki et al. | |
| 5,923,663 | A | 7/1999 | Bontemps et al. | |
| 6,127,953 | A * | 10/2000 | Manzardo | 341/87 |
| 6,222,854 | B1 | 4/2001 | Dove | |
| 6,556,589 | B2 | 4/2003 | McRobert et al. | |
| 6,600,755 | B1 * | 7/2003 | Overs et al. | 370/465 |
| 6,671,758 | B1 * | 12/2003 | Cam et al. | 710/100 |
| 2002/0046267 | A1 | 4/2002 | Andra et al. | |
| 2002/0130650 | A1 * | 9/2002 | Nagase et al. | 323/371 |
| 2003/0179709 | A1 | 9/2003 | Huff | |
| 2004/0153701 | A1 * | 8/2004 | Pickell | 714/4 |
| 2004/0223462 | A1 * | 11/2004 | Cromer et al. | 370/252 |

FOREIGN PATENT DOCUMENTS

| WO | WO 98/45996 | 10/1998 |
| WO | WO 00/54419 | 9/2000 |
| WO | WO 0054419 A1 * | 9/2000 |

OTHER PUBLICATIONS

IEEE 802.3 standard, chapter 28.1.2 section k 2002.*
STE400: 10/100 Fast Ethernet 4 Port Transceiver, Sep. 2001, Accessed from the Internet at URL: [http://www.ortodoxism.ro/datasheets/SGSThomsonMicroelectronics/mXyurtu.pdf], Apr. 27, 2007, pp. 1-34.
Frazier, H., et al. "*Gigabit Ethernet: From 100 to 1,000 Mbps.*", IEEE Internet Computing, vol. 3, Issue 1, Jan.-Feb. 1999, pp. 24-31.
Everitt, J., et al. "*A CMOS Transceiver for 10-Mb/s and 100-Mb/s Ethernet*", IEEE Journal of Solid State Circuits, vol. 33, No. 12, Dec. 1998, pp. 2169-2177.

* cited by examiner

Primary Examiner—Nathan Flynn
Assistant Examiner—Joshua Joo
(74) Attorney, Agent, or Firm—Merchant & Gould P.C.

(57) ABSTRACT

A scheme by which a network device may be made to locate data signals from a plurality of potential data sources in the context of a network environment having devices that employ autonegotiation over an autonegotiation period. The scheme involves switching an input port on the network device between the various potential data sources on a one-by-one basis. If an idle signal indicating no ensuing autonegotiation period is detected, the switching action is terminated and the input port assignment is maintained for as long as the link is detected. Thereafter, the device returns to the switching state. If an idle signal indicating an ensuing autonegotiation period is detected, the switching action is stopped for a period equal to or longer than the autonegotiation period. Thereafter, if an idle signal is detected, the input port assignment is maintained for as long as the link is detected.

31 Claims, 5 Drawing Sheets

10/100 MBS NETWORK DEVICE

FIELD OF THE INVENTION

The invention relates generally to network devices deployable in communication networks, and more particularly to a network device, such as a media converter, that can be deployed in a network including network devices capable of autonegotiating between communication rates of 10 and 100 megabits per second (Mbs).

BACKGROUND OF THE INVENTION

Communication networks are commonly made up of varying communication media. For example, unshielded twisted pair (copper wire) may be used as a communication medium for transporting data over relatively short distances, such as throughout a local network in a small office setting. However, to transport data over longer distances, the data is usually transmitted via optical fiber. For example, a multimode optical fiber may support data communications over 300-500 meters, and a single mode fiber may support data communications over several kilometers, or even over hundreds of kilometers.

In many cases it is necessary to interface a local network that uses unshielded twisted pair lines with a network that uses optical fiber. In such cases, there must be a point at which the signals are converted. Media converters are often used for just such a purpose.

FIG. 1 shows a simple exemplary network that uses both optical and unshielded twisted pair lines as communication media. As can be seen from FIG. 1, the exemplary network includes a first network device 100 (a switch or a workstation, for example) and a second network device 102. A second media converter may optionally be interposed between the first media converter 104 and the network device 102. Interposed between the two network devices 100 and 102 is a media converter 104. The communication medium 106 that connects the first network device 100 and the media converter 104 is unshielded twisted pair. On the other hand, the communication medium 108 that connects the second network device 102 and the media converter 104 is optical fiber. For a data signal to be communicated from the first network device 100 to the second network device 102, it first propagates along the unshielded twisted pair lines 106, and is received by an input port on the media converter 104. The media converter 104 responds to the reception of such a signal by transmitting an optical signal along the fiber optic line 108, whereupon the signal is received by the second network device 102.

In FIG. 1, communication medium 106 is depicted as a single line, because it represents a single data path: data may flow between the first network device 100 and the media converter 104. In practice, the communication medium 106 may be composed of many individual lines. For example, it is commonplace for the data signals that are communicated along unshielded twisted pair lines to be double-ended signals. Of course, such an arrangement necessitates that a single data path be composed of a pair of lines. Further, it is commonplace for a network device that communicates using unshielded twisted pair (such as network device 100) to receive double-ended data signals along one pair of lines, and to transmit double-ended signals along a second pair of lines. According to such a convention, communication medium 106 includes at least four lines—a pair of lines for data going in one direction and a pair of lines for data going in the other direction.

Given the aforementioned convention, the media converter 104 must receive data (from the first network device 100) from one pair of lines, and transmit data (to the first network device 100) along a second pair of lines. The media converter 104, however, is not free to arbitrarily select which pair of lines it will receive data from and which pair of lines it will transmit data along. The media converter 104 must receive data from the same set of lines that the first network device 100 uses for transmission. Similarly, the media converter 104 must transmit data along the same set of lines that the first network device 100 uses for reception of data. Such a condition would be easily satisfied if it was known in advance which pair of lines the first network device 100 intended to use for reception and which pair of lines the first network device 100 intended to use for transmission. In practice, though, different network devices use different pairs of lines for reception and transmission, meaning that such advance knowledge is possible only if the media converter 104 has advance knowledge regarding the kind of network device (e.g., hub, workstation, switch, etc.) to which it is attached. Of course, media converters must have a means for determining which pair of lines to assign as input lines and which to assign as output lines, even in the absence of such advance knowledge.

U.S. Pat. No. 5,923,663 ("the '663 patent") teaches one method by which a media converter may determine which pair of lines are input lines and which pair are output lines. Briefly, the method taught by the '663 patent involves a media converter "listening" for a data signal on a first pair of lines and then on a second pair of lines. On whichever pair of lines the media converter "hears" data, it may be assumed that that pair of lines is being used by the attached network device for transmission of data; this pair of lines is assigned to the input port of the media converter. The remaining pair of lines is assigned to the output port. The media converter maintains its line assignment, as long it detects a data link. When no such data link is detected, the media converter returns to its task of "listening" for data on either pair of lines.

The method taught by the '663 patent is unsuitable for communication networks in which autonegotiation is supported. Autonegotiation oftentimes necessitates the occurrence of an autonegotiation period, a period of time during which the attached network device does not transmit. A media converter using the method taught by the '663 patent interprets an autonegotiation period as a data link loss. Consequently, an autonegotiation causes the media converter to return to its task of "listening" for data on either pair of lines.

From the foregoing, it can be seen that there exists a need for a scheme by which a media converter can select a particular pair of lines for transmission and a particular pair of lines for reception.

SUMMARY OF THE INVENTION

The Background of the Invention section herein describes the backdrop against which the present invention was developed. According to one embodiment of the present invention, a method of selecting a data signal source from amongst a plurality of potential sources may include selecting a source from amongst the plurality of potential sources. Thereafter, the selected source is monitored for an indication of communication speed. If no indication of communication speed is observed, another data source is selected. Otherwise, the selection is maintained.

According to another embodiment, a method of selecting a data signal source from amongst a plurality of potential sources may include selecting a source from amongst the plurality of potential sources. Thereafter, the selected source is monitored for an indication of an ensuing autonegotiation period. Next, expiration of the ensuing autonegotiation period is awaited. If after expiration of the autonegotiation period, no indication of communication speed is observed another potential source is selected. Otherwise, the selection is maintained.

According to yet another embodiment, a method of selecting a data signal source from amongst a plurality of potential sources may include selecting a source from amongst the plurality of potential sources. Thereafter, the selected source is monitored for an indication of communication speed or an ensuing autonegotiation period. If no indication of communication speed or an ensuing autonegotiation period is observed another potential data source is selected. Otherwise, the selection is maintained. If an indication of an ensuing autonegotiation period is observed, expiration of the ensuing autonegotiation period is awaited. If after expiration of the autonegotiation period, no indication of communication speed is observed another potential source is selected. Otherwise, the selection is maintained.

According to yet another embodiment, a method for a media converter to identify which of two pairs of pins on a data jack is carrying a data signal sent from a network device. The media converter includes a physical interface having an input port into which the data signal from the network device is to be supplied. The media converter further includes a switch interposed between the data jack and the physical interface. The method may include using the switch to alternately couple the input port on the physical interface between a first pair of pins on the data jack and a second pair of pins on the data jack. Thereafter, the pair of pins coupled to the input port of the physical interface is monitored for an indication of the speed at which the network device will communicate. Finally, upon determining the communication speed, alternate coupling of the physical interface between the first pair of pins on the data jack and the second pair of pins on the data jack is ceased.

According to yet another embodiment, a media converter may include a switch having a first end and a second end. The first end may be capable of coupling to any of a plurality of potential sources of a data signal. The second end may be coupled to an input port of a physical interface that converts the data signal from a signal that propagates along a first medium to a signal that propagates along a second medium. The media converter may also include an optical transceiver coupled to the physical interface and a logic device coupled to the physical interface. The logic device may be arranged to cause the switch to iteratively couple its first end to each of the plurality of potential data sources on a one-by-one basis, until instructed to cease such iterative coupling by the logic device. The logic device may further cause the media converter to receive a signal from the physical interface. The signal communicates a data rate at which the data signal will be communicated. The logic device may further be arranged to instruct the switch to cease the iterative coupling, upon reception of the signal communicating the data rate at which the data signal will be communicated.

According to yet another embodiment, a media converter may include a switch having a first end and a second end. The first end may be capable of coupling to any of a plurality of potential sources of a data signal. The second end may be coupled to an input port of a physical interface that converts the data signal from a signal that propagates along a first medium to a signal that propagates along a second medium. The media converter may also include an optical transceiver coupled to the physical interface. Finally, the media converter may include means for controlling the switch so as to couple the input port of the physical interface to one of the plurality of potential data sources actually carrying a data signal.

DETAILED DESCRIPTION OF THE INVENTION

The scheme disclosed herein is useful in any setting in which a device, such as a media converter, must identify which of a plurality of communication lines is to be assigned to an input port. If there are only two communication lines, it may be deduced by process of elimination that the remaining line is to be assigned to an output port. According to one embodiment, the scheme is implemented by a media converter. Further, the scheme presented herein can be used to identify which of any number of communication lines is to be assigned to an input port. For the sake of illustration, the scheme is described as being used to select from amongst two pairs of communication lines within an RJ-45 jack.

A scheme by which a media converter may identify which of a plurality of communication lines is to be assigned to the media converter's input port is summarized as follows. A switch is interposed between the plurality of communication lines and a physical interface chip in the media converter. The switch is capable of connecting any one from amongst the plurality of lines to the input port of the physical interface chip. The switch is controlled so that it connects each of the plurality of communication lines to the input port of the physical interface on a one-by-one basis. During the period that a communication line is coupled to the input port of the physical interface, the physical interface looks for an idle signal. If no idle signal is found, the process carries on, and the switch couples another of the plurality of communication lines to the input port of the physical interface. If, on the other hand, an idle signal is found, one of two outcomes is possible: (1) the network device generating the idle signal is capable of communicating at only a single communication rate, meaning that autonegotiation will not ensue; or (2) the network device generating the idle signal is capable of communicating at more than one communication rate, meaning that autonegotiation will ensue. In the first instance, the media converter operates under the assumption that the line presently coupled to the input port of the physical interface is appropriate, and that the presently established coupling should be maintained for so long as a data link is present. In the second instance, the media converter operates under the assumption that the line coupled to the input port of the physical interface may be appropriate. The media converter stops the switching action of the switch, long enough for the ensuing autonegotiation period to elapse. Thereafter, the media converter looks for the presence of an idle signal on the presently attached line. If an idle signal is present, then the media converter operates under the assumption that the line presently coupled to the input port of the physical interface is appropriate, and that the presently established coupling should be maintained for so long as a data link is present.

Figure 1:
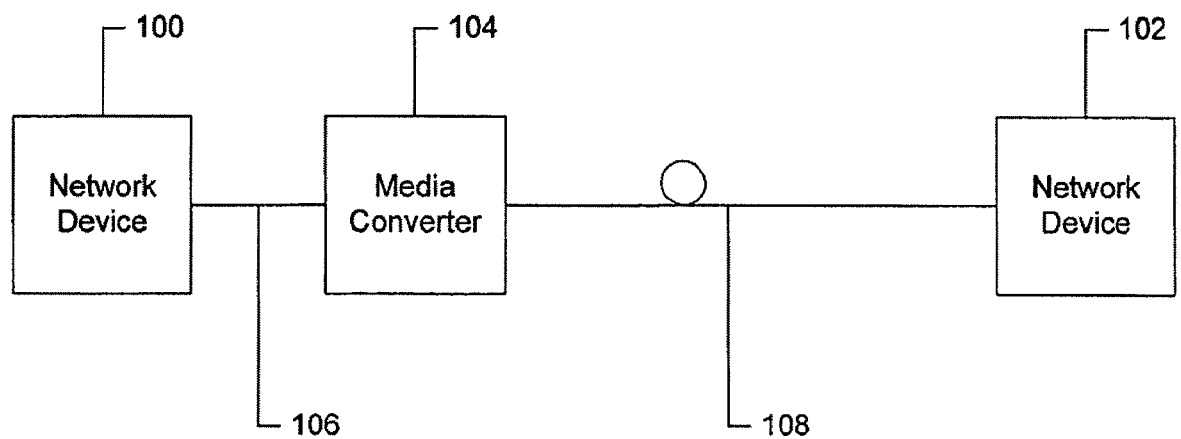
FIG. 1 depicts an exemplary communication network in which a media converter according to the present invention may be deployed.
Figure 2:
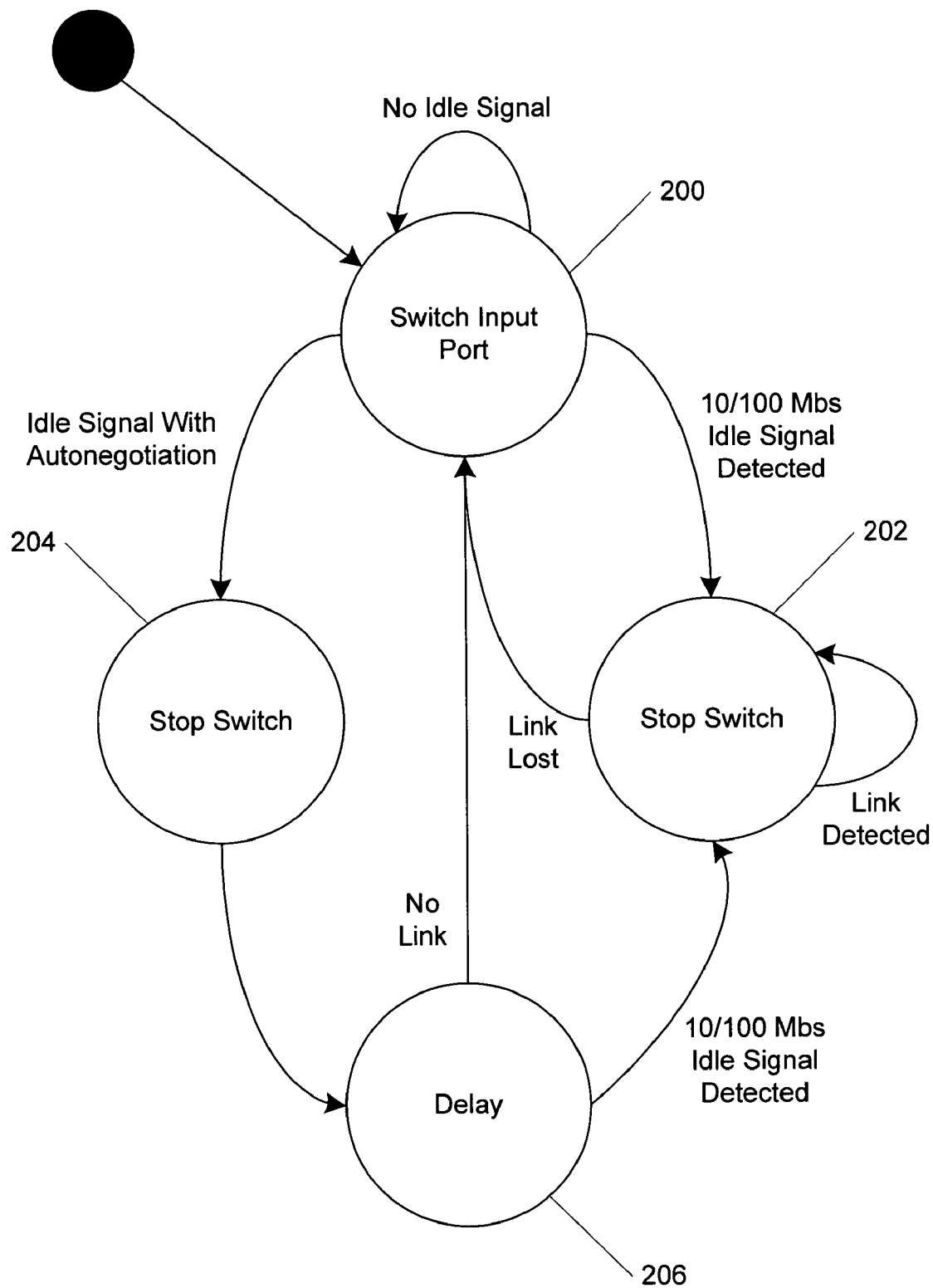
FIG. 2 depicts a method for choosing which of a plurality of potential data sources should be coupled to the input port of a media converter.

FIG. 2 depicts a state transition diagram describing a method for choosing which of a plurality of potential data sources should be coupled to the input port of a media converter. It should be noted that the state transition diagram depicted in FIG. 2 may be carried out by any sort of device, but is described herein as being carried out by a media converter constructed in accordance with FIG. 3 (discussed below).

As depicted in FIG. 2, the media converter initially begins operation in a switching state 200. In this state, a switch is used to couple any one of a plurality of potential data sources to an input port of the media converter, on a one-by-one basis. For example, assuming that the potential data sources are presented in the form of data communication pins within an RJ-45 jack, there are two potential data sources: in an RJ-45 jack, data may be carried by a differential signal on: (1) pins 1 and 2 (data source #1); or (2) pins 3 and 6 (data source #2). Per switching state 200, pins 1 and 2 (data source #1) would first be coupled to an input port of the media converter. Then, after a period of time, pins 3 and 6 (data source #2) would be coupled to the input port of the media converter. Pins 1 and 2 would, of course, be de-coupled from the input port during this period of time. Optionally, assuming that only two potential data sources exist, whichever data source is not coupled to the input port may be coupled to the output port. Thus, switching state 200 optionally consists of alternately switching the coupling assignments of the input and output ports between data sources. In sum, assuming N potential data sources, switching state 200 may result in the following sequence of data sources being coupled to the input port: {1, 2, ... N, 1, 2, ... N, ... }. The precise sequence is a design choice that may vary according to application. Preferably, each of the potential data sources is iteratively coupled to the input port on a one-by-one basis.

The device remains in the switching state 200 as long as no link is detected. Exit from the switching state 200 is possible only when an idle signal is detected. In the context of a network having a network device capable of communicating at 10 or 100 Mbs, three types of line or idle signals may exist: (1) a normal link pulse, which indicates that the network device generating the idle signal can communicate only at 10 Mbs; (2) a multi-level tier 3 pulse (MLT-3 pulse), which indicates that the network device generating the idle signal can communicate only at 100 Mbs; and (3) a fast link pulse, which indicates that the network device generating the idle signal can communicate at 10 or 100 Mbs. An idle signal is a signal periodically generated by a network device to indicate that it is present on the network. The term "line signal" refers to both an idle signal or data traffic. Where the term "idle signal" has been used herein, the term "line signal" has equal applicability. If the data source presently coupled to the input port of the media converter is attached to the output port of a functioning network device, an idle signal should be found. Otherwise, no idle signal will be found.

If a normal link pulse or an MLT-3 pulse is detected, the media converter transitions from the switching state 200 to the stop-switch state 202. The switching action of the switch is halted during the period in which the media converter is in the stop-switch state 202. Thus, the coupling assignments prevailing at the moment of exit from the switch state 200 are maintained during the duration in which the media converter is in the no-switch state 202. If switching state 200 included the act of coupling a data source to the output port of the media converter, the coupling assignment of the output port is also maintained. The no-switch state 202 is exited only when no communication link is detected by the media converter, at which time the media converter returns to the switch state 200.

Upon detection of a fast link pulse containing autonegotiation information (communication rate and half or full duplex), the media converter transitions from the switching state 200 to the stop-switch state 204. Like the stop-switch state 202, the stop-switch state 204 involves the switching action of the switch being halted during the period in which the media converter is in the stop-switch state 204. Thus, the coupling assignments prevailing at the moment of exit from the switch state 200 are maintained during the duration in which the media converter is in the no-switch state 204. If switching state 200 included the act of coupling a data source to the output port of the media converter, the coupling assignment of the output port is also maintained.

The no-switch state 204 is immediately exited after halting of the switch, whereupon the delay state 206 is entered. During the delay state 206, the media converter undertakes no action, and simply waits for expiration of the autonegotiation period. Autonegotiation is a process by which a first network device determines the communication capabilities of a second network device; the two network devices then agree to communicate at the fastest communication rate feasible. Full or half duplex may also be established during autonegotiation. The process of settling upon a communication rate often consumes a duration of time referred to as an "autonegotiation period." During an autonegotiation period, one or both network devices may cease transmission of idle signals. Thereafter, the devices resume communication.

After expiration of the autonegotiation period, the media converter transitions to the switching state 200 if no link is detected. Otherwise, if a communication link is detected, the device transitions to the stop-switch state 202, which has been previously described.

Figure 3:
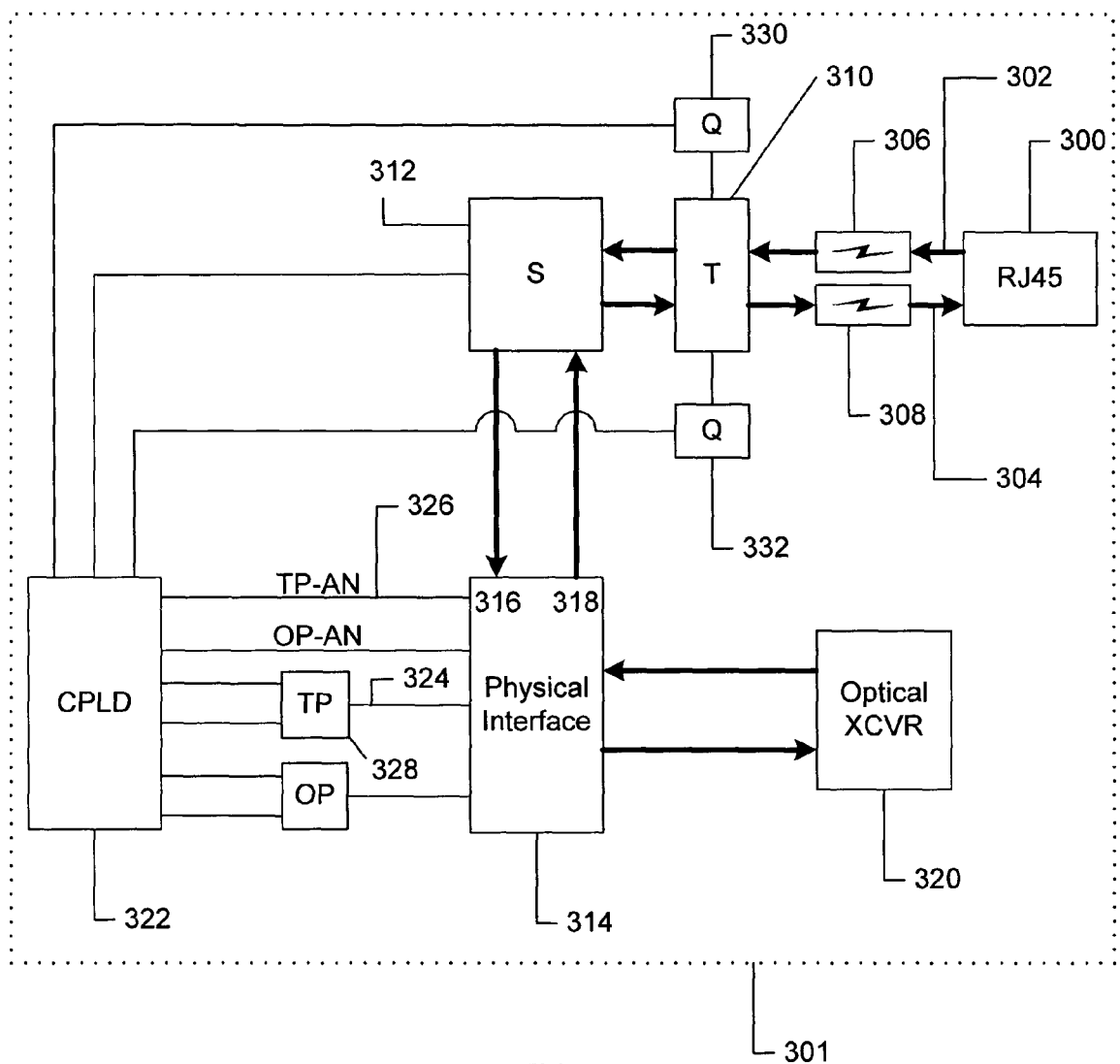
FIG. 3 depicts one embodiment of a media converter in accordance with an embodiment of the present invention.

FIG. 3 depicts one embodiment of a media converter in accordance with an embodiment of the present invention. The media converter of FIG. 3 is but one example of a device that may carry out the method described with reference to FIG. 2. Of course, other devices may also carry out the method described in FIG. 2, and such devices are within the scope of the present application.

As can be seen from FIG. 3, two potential data sources 302 and 304 are presented via an RJ-45 jack 300. The two data sources 302 and 304 are embodied in the form of two pairs of unshielded lines, each pair 302 and 304 capable of carrying a differential data signal. One pair 302 is intended to carry a differential data signal from a network device to the media converter, and the other pair 304 is intended to carry a differential data signal from the media converter to the network device. When the coupling assignment is properly arrived at, the pair of lines 302 intended to carry a differential data signal from the network device to the media converter is coupled to the input of the media card. Of course, the other pair 304 is coupled to the output.

Figure 5:
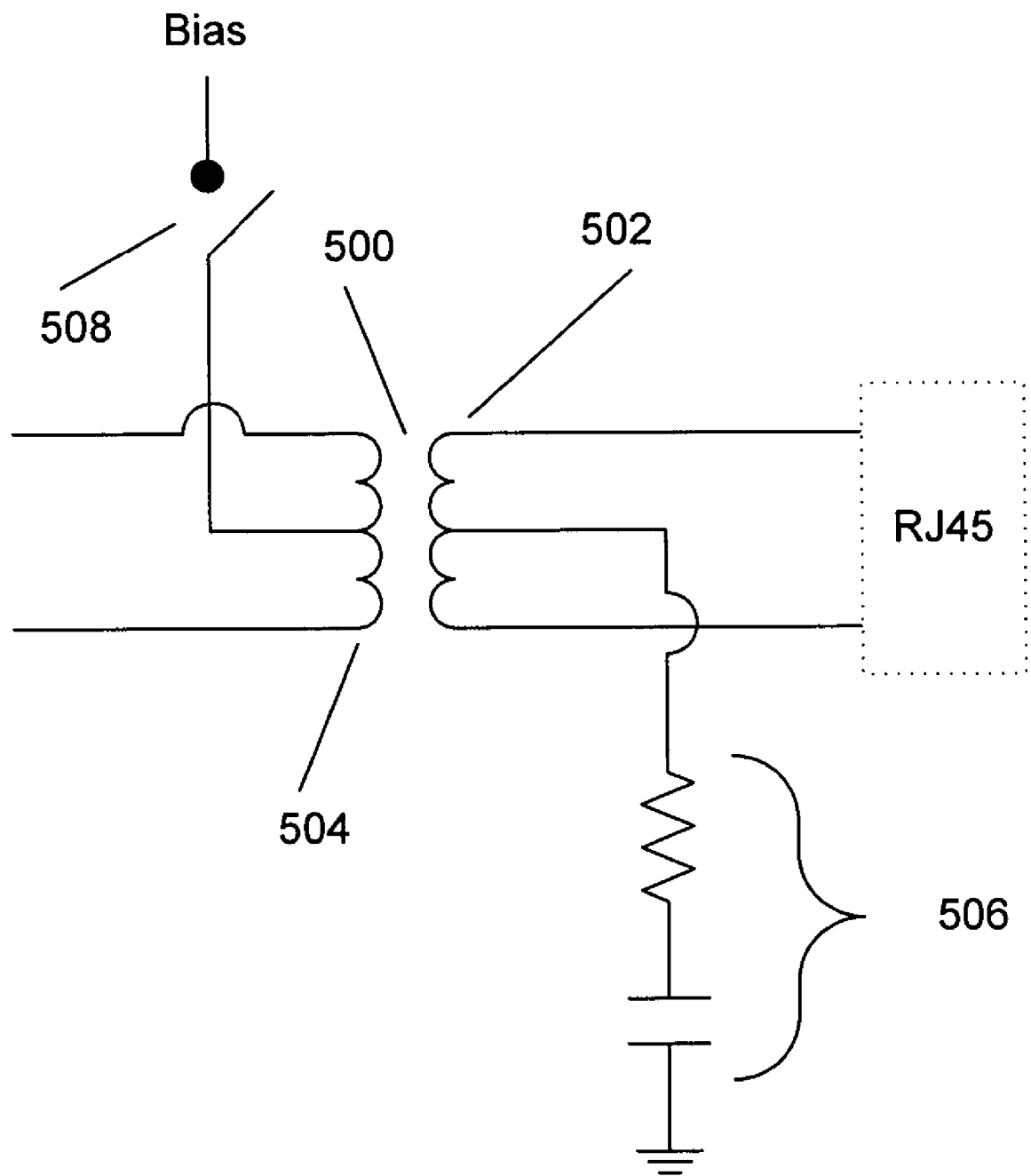
FIG. 5 depicts a transformer circuit suitable for use in the transformer unit depicted in FIG. 3.

Each potential data source is coupled, via lightning protectors 306 and 308, to a transformer unit 310. The transformer unit 310 may consist of two separate transformers, a first transformer for use with one of the pairs of unshielded lines 302 or 304, and a second transformer for use with the other pair of unshielded lines 302 or 304. One example of transformer circuitry that may be used in transformer unit 310 is depicted in FIG. 5. The transformer unit 310 couples the lines from the RJ-45 to a switch unit 312. The transformer unit 310 may be used to introduce a bias to the signal carried on either pair 302 or 304, as explained below.

The switch unit 312 is coupled to the input and output ports 316 and 318 of the physical interface 314. The switch unit 312 is capable of connecting either pair 302 and 304 to either port 316 and 318. For example, the switch unit 312 may connect pair 302 to input port 316 and pair 304 to output port 318 (as depicted in FIG. 3). Alternatively, switch unit 312 may connect pair 302 to output port 318 and pair 304 to input port 316. The physical interface is coupled to the optical transceiver 320.

The media converter works generally as follows. A signal may arrive at the media converter via one of the twisted pairs 302 or 304. This signal is sent through a lightning protector 306 or 308, through the transformer 310, through the switch unit 312, and to the input port 316 of the physical interface 314. The physical interface 314 performs the necessary processing to appropriately drive the optical transceiver 320, so that the optical transceiver 320 produces an optical signal that contains that same information carried on the signal that arrived at the twisted pair end of the media converter. In this way, the signal is converted from a signal carried along a metallic twisted pair media to one that is carried along an optical fiber. Of course, the process works in reverse, too. An optical signal may arrive at the optical transceiver 320, be converted by the physical interface 314, and be ultimately delivered to output pair 304. Thus, in this way, an optical signal is converted to a signal carried along a twisted pair medium.

As can be seen from FIG. 3, a complex programmable logic device (CPLD) 322 is coupled to the physical interface 314. The CPLD 322 receives at least four sorts of signals from the physical interface: (1) a signal carried on line 324, indicating that the data communication rate is 10 Mbs (this signal is generated while a normal link pulse is observed at the input port 316 of the physical interface 314); (2) a signal carried on line 324, indicating that the data communication rate is 100 Mbs (this signal is generated while an MLT-3 pulse is observed at the input port 316 of the physical interface 314); (3) a signal carried on line 324, indicating that no communication is observed at all (i.e., this signal is generated when no communication is observed at all at the input port 316 of the physical interface 314); and (4) a signal carried on line 326 indicating that an autonegotiation period is to ensue (this signal is generated in response to a fast link pulse being observed at the input port 316 of the physical interface 314).

As described above, line 324 communicates the occurrence of three different events: (1) communication rate is 10 Mbs; (2) communication rate is 100 Mbs; and (3) communication is lost. One way for a single line to accommodate such a task is for it to carry a tristate signal. For example, line 324 may carry a "0" when the communication rate is 10 Mbs, and may carry a "1" when the communication rate is 100 Mbs. When the communication link is lost, the line 324 may simply be in a high impedance state. In such an instance, a tristate converter 328 may be interposed between line 324 and the complex programmable logic device 322. The tristate converter 328 converts the tristate signal to a two-bit binary signal, with each bit being carried on a separate line extending between the tristate converter 328 and the CPLD 322. For example, a "0" carried on line 324 may be represented by a "01" (the "0" is carried on one line, while the "1" is carried on the other). A "1" carried on line 324 may be represented by a "10." Finally, a high impedance state carried on line 324 may be represented by a "11." An example of a suitable tristate converter 328 is discussed with reference to FIG. 4, below.

As can also be seen from FIG. 3, the CPLD 322 has control over the switch unit 312 and also has control over two bias switches 330 and 332. The CPLD 322 utilizes the information received from the physical interface 314 to exert control over the switch unit 312 and two bias switches 330 and 332, so as to properly arrive at the coupling assignments for the input and output ports 316 and 318.

Initially, the CPLD 322 controls the switch unit 312, so that it is alternately switching pairs 302 and 304 between input and output ports 316 and 318. For example, CPLD 322 may control switch unit 312 so that initially pair 302 is coupled to the input port 316 and pair 304 is coupled to the output port 308 for an interval of time. After the expiration of a switching interval, CPLD 322 controls the switching unit 312 so that the coupling assignment is reversed. In other words, pair 302 is coupled to the output port 318 and pair 304 is coupled to the input port 316. After the expiration of another switching interval, the coupling assignments reverse yet again, and so on.

During each switching interval, the physical interface 314 observes its input port 316, looking for an idle signal. If an idle signal is found, one of several events may occur: (1) if the idle signal is a normal link pulse, then a "0" is output to line 324 (a "01" is received by the CPLD 322 due to the tristate converter 328); (2) if the idle signal is an MLT-3 pulse, then a "1" is output to line 324 (a "10" is received by the CPLD 322 due to the tristate converter 328); and (3) if the idle signal is a fast link pulse containing autonegotiation information, then a trigger is transmitted on line 326. Of course, if no communication is observed at all, line 324 is put into a high impedance state (a "11" is received by the CPLD 322 due to the tristate converter 328).

The CPLD 322 is programmed to respond to the potential stimuli as follows. Upon reception of a "01" or "10"—meaning that it has been established that communication will occur at a known data rate—the CPLD 322 commands the switch unit 312 to cease switching. In other words, the coupling assignment prevailing during the present switching period is maintained. The CPLD 322 is programmed to ensure that such coupling assignment is maintained until a "11" is received from the tristate converter 328. In other words, the switching action of the switch unit 312 does not resume until the physical interface 314 observes that the communication link has been lost.

If, on the other hand, the CPLD receives a trigger command on line 326, the CPLD starts a clock. The CPLD uses the clock to wait for the expiration of the ensuing autonegotiation period. After the expiration of the autonegotiation period, the CPLD waits to be informed of the presence of an idle signal on the input port of the physical interface 314. If no such idle signal is indicated (i.e., if a "11" is received from the tristate converter 328), the CPLD 322 commands the switch unit 312 to resume its switching action. On the other hand, if after the expiration of the autonegotiation period, a "01" or "10" is received from the tristate converter 328—meaning that it has been established that autonegotiation successfully occurred and communication will occur at a known data rate—the CPLD 322 commands the switch unit 312 to cease switching. In other words, the coupling assignment prevailing during the present switching period is maintained. The CPLD 322 is programmed to ensure that such coupling assignment is maintained until a "11" is received from the tristate converter 328. Stated another way, the switching action of the switch unit 312 does not resume until the physical interface 314 observes that the communication link has been lost.

A housing 301 may enclose or partially enclose each of the aforementioned structures of the media converter depicted in FIG. 3.

Figure 4:
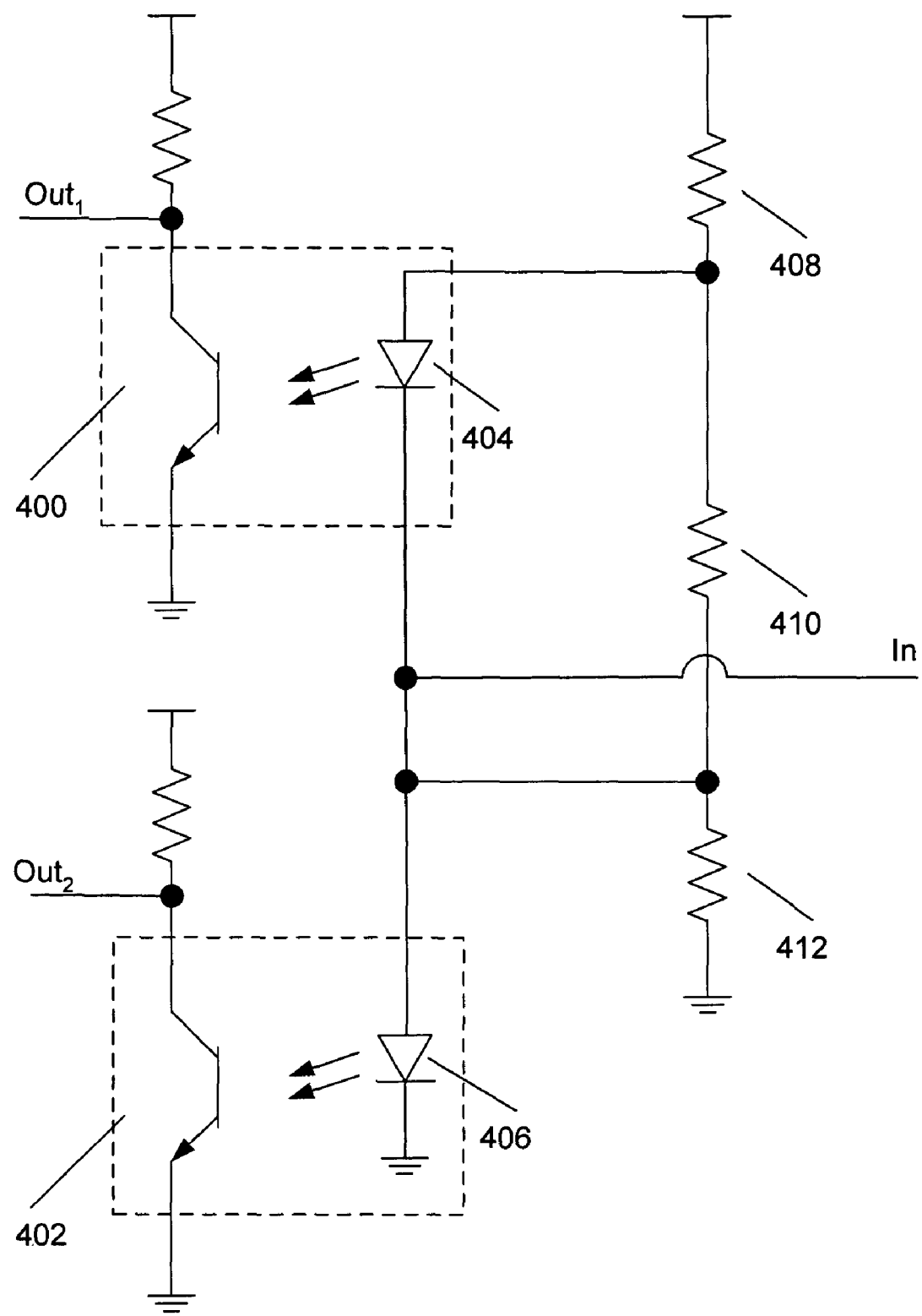
FIG. 4 depicts one suitable embodiment of the tristate converter depicted in FIG. 3.

FIG. 4 depicts one suitable embodiment of the tristate converter 328 depicted in FIG. 3. As can be seen in FIG. 4, the tristate converter therein includes first and second phototransistors 400 and 402. Each phototransistor 400 and 402 has its emitter grounded. The collectors of each photoresistor 400 and 402 are connected in series with a resistor to a voltage supply. The collectors of each photoresistor 400 and 402 serve as the outputs of the tristate converter and are labeled $Out_1$ and $Out_2$.

Unless the voltage at each base exceeds the activation voltage for the base-emitter junction of each phototransistor 400 and 402, the voltages at $Out_1$ and $Out_2$ remains equal to the voltage at the voltage supply (because no current is drawn through the resistors coupled to the collectors). Under such conditions, the output of the tristate converter is "11" ($Out_1=1$ and $Out_2=1$).

The tristate converter also includes first and second photodiodes 404 and 406 arranged to irradiate the bases of phototransistors 400 and 402, respectively. The tristate converter also includes a voltage divider, which consists of three resistors 408, 410, and 412. The p-side of the first photodiode 404 is connected to a point in between resistor 408 and 410. Similarly, the p-side of the second photodiode 406 is connected to a point in between resistor 410 and 412. An input line (labeled "In") is coupled between the n-side of photodiode 404 and the p-side of photodiode 406. The values of resistors 408, 410, and 412 are chosen so that when the input line is in a high impedance state, neither photodiode 404 nor 406 has sufficient current running therethrough to cause the voltage at the base of either phototransistor 400 or 402 to exceed the activation threshold. Accordingly, as described above, the output of the tristate converter is "11" when the input line is in a high impedance state. On the other hand, if the input line carries a "1" (i.e., if it carries a high voltage), then photodiode 404 is deactivated (no current runs through photodiode 404), while photodiode 406 is illuminated intensely. Consequently, $Out_1=1$, and $Out_2=0$ (because current is drawn through the resistor connected to the collector of phototransistor 402). Conversely, if the input line carries a "0" (i.e., if it carries a low voltage), then photodiode 404 illuminates intensely, while photodiode 406 is deactivated (no current runs through photodiode 406). Consequently, $Out_1=0$, and $Out_2=1$ (because current is drawn through the resistor connected to the collector of phototransistor 400).

FIG. 5 depicts a transformer circuit suitable for use in the transformer unit 310 depicted in FIG. 3. As noted above in the discussion with reference to FIG. 3, the transformer unit 310 may include two of the transformer circuits depicted in FIG. 5—one for each potential data source in the RJ-45 jack.

As can be seen from FIG. 5, the transformer circuit includes a transformer 500 having a primary winding 502 and a secondary winding 504. A resistor-capacitor circuit (RC circuit) 506 is center tapped to the primary winding 502. The RC circuit 506 causes the signal carried along the primary winding 502 to resist forces tending to bias the signal away from ground.

A switch 508 is center tapped to the secondary winding 504. The switch 508 couples/decouples a bias voltage to the center tap of the secondary winding. When the switch is closed, the signal carried along the secondary winding 504 is biased about the bias voltage. The switch 508 may be under the control of the CPLD 322 of FIG. 3. When the secondary winding 504 is coupled to the output port 318 of the physical interface 314 (FIG. 3), the switch 508 may be closed, so as to provide a line bias required for the physical interface 314 to properly drive the secondary winding 504.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

The claimed invention is:

1. A method of selecting a data signal source from amongst a plurality of potential sources, the method comprising:
    (a) selecting a source from amongst the plurality of potential sources;
    (b) enabling directional connection between the source and a physical interface using a biasing switch;
    (c) monitoring the source selected in step (a) at a programmable logic device for an indication of communication speed, wherein monitoring the source includes monitoring for an indication of a normal link pulse, a multi-level tier 3 pulse, and a fast link pulse received at the programmable logic device via a tri-state converter, the tri-state converter communicating to the programmable logic device a two-bit digital signal, each bit being carried on a separate line, indicating communication speed derived from a tri-state signal provided by the physical interface;
    (d) returning to step (a) if no indication of communication speed is observed; and
    (e) maintaining selection of the source of step (a) if an indication of communication speed is observed.

2. The method of claim 1, further comprising:
    returning to step (a), selecting a second source from amongst the plurality of potential sources, upon absence of a data signal from the source previously selected in step (a).

3. A method of selecting a data signal source from amongst a plurality of potential sources, the method comprising:
    (a) selecting a source from amongst the plurality of potential sources;
    (b) enabling directional connection between the source and a physical interface using a biasing switch;
    (c) monitoring the source selected in step (a) at a programmable logic device for an indication of an ensuing autonegotiation period, wherein monitoring the source includes monitoring for an indication of a normal link pulse, a multi-level tier 3 pulse, and a fast link pulse received at the programmable logic device via a tri-state converter, the tri-state converter communicating to the programmable logic device a two-bit digital signal, each bit being carried on a separate line, indicating communication speed derived from a tri-state signal provided by the physical interface;
    (d) waiting for expiration of the ensuing autonegotiation period;
    (e) returning to step (a) if after expiration of the autonegotiation period, no indication of communication speed is observed; and
    (f) maintaining selection of the source previously selected in step (a) if after expiration of the autonegotiation period, an indication of communication speed is observed.

4. The method of claim 3, further comprising:
    returning to step (a), selecting a second source from amongst the plurality of potential sources, upon absence of a data signal from the source previously selected in step (a).

5. The method of claim 3, wherein waiting for the expiration of the autonegotiation period comprises waiting 20 seconds.

6. A method of selecting a data signal source from amongst a plurality of potential sources, the method comprising:

(a) selecting a source from amongst the plurality of potential sources;

(b) enabling directional connection between the source and a physical interface using a biasing switch;

(c) monitoring the source selected in step (a) at a programmable logic device for an indication of communication speed or an ensuing autonegotiation period, wherein monitoring the source includes monitoring for an indication of a normal link pulse, a multi-level tier 3 pulse, and a fast link pulse received at the programmable logic device via a tri-state converter, the tri-state converter communicating to the programmable logic device a two-bit digital signal, with each bit being carried on a separate line, indicating communication speed derived from a tri-state signal provided by the physical interface;

(d) returning to step (a) if no indication of communication speed or an ensuring autonegotiation period is observed;

(e) maintaining the selection of step (a), if an indication of communication speed is observed;

(f) waiting for expiration of the ensuing autonegotiation period, if an indication of an ensuing autonegotiation period is observed;

(g) returning to step (a) if after expiration of the autonegotiation period, no indication of communication speed is observed; and (h) maintaining selection of the source previously selected in step (a) if after expiration of the autonegotiation period, an indication of communication speed is observed.

7. The method of claim 6, further comprising the following step to be carried out after either steps (d) or (g): returning to step (a) upon absence of a data signal from the source.

8. The method of claim 6, wherein waiting for the expiration of the autonegotiation period comprises waiting 20 seconds.

9. A method for a media converter to identify which of two pairs of pins on a data jack is carrying a data signal sent from a network device, wherein the media converter includes a physical interface having an input port into which the data signal from the network device is to be supplied, and wherein the media converter further includes a switch interposed between the data jack and the physical interface and at least one biasing switch enabling a directional connection between the physical interface and the data jack, the method comprising:

using the switch and the biasing switch to alternately couple the input port on the physical interface between a first pair of pins on the data jack and a second pair of pins on the data jack;

monitoring a pair of pins coupled to the input port of the physical interface for an indication of a speed at which the network device will communicate, the pair of pins corresponding to at least one of the first pair of pins and the second pair of pins, wherein monitoring the pair of pins includes monitoring for a normal link pulse, a multi-level tier 3 pulse, and a fast link pulse using a programmable logic device, the programmable logic device receiving the indication of the communication speed via a tri-state converter, the tri-state converter communicating to the programmable logic device a two-bit digital signal, with each bit being carried on a separate line, indicating the communication speed derived from a tri-state signal provided by the physical interface;

upon determining the communication speed, ceasing to alternately couple the physical interface between the first pair of pins on the data jack and the second pair of pins on the data jack.

10. The method of claim 9, wherein the data jack is an RJ-45 data jack.

11. The method of claim 9, wherein monitoring the pair of pins coupled to the input port of the physical interface for an indication of the speed at which the network device will communicate comprises monitoring the pair of pins for an idle signal carried upon the pair of pins.

12. The method of claim 9, further comprising:

monitoring the pair of pins coupled to the input port of the physical interface for an indication of an ensuing autonegotiation period;

waiting for expiration of the ensuing autonegotiation period, if an indication of an ensuing autonegotiation period is observed;

after expiration of the ensuing autonegotiation period, monitoring a pair of pins coupled to the input port of the physical interface for an indication of the speed at which the network device will communicate, the pair of pins corresponding to at least one of the first pair of pins and the second pair of pins; and upon determining the communication speed, ceasing to alternately couple the physical interface between the first pair of pins on the data jack and the second pair of pins on the data jack.

13. The method of claim 12, wherein monitoring the pair of pins coupled to the input port of the physical interface for an indication of an ensuing autonegotiation period comprises monitoring the pair of pins for an idle signal carried upon the pair of pins.

14. A media converter comprising:

a switch having a first end and a second end, the first end capable of coupling to any of a plurality of potential sources of a data signal, the second end coupled to an input port of an physical interface that converts the data signal from a signal that propagates along a first medium to a signal that propagates along a second medium;

at least one biasing switch enabling a directional connection between the physical interface and a selected source from among the plurality of potential sources;

an optical transceiver coupled to the physical interface;

a programmable logic device coupled to the physical interface via tri-state converter;

wherein the programmable logic device is arranged to cause the switch to iteratively couple a first end of the switch to each of the plurality of potential data sources on a one-by-one basis, until instructed to cease such iterative coupling by the programmable logic device;

receive a signal from the physical interface, the signal communicating a data rate at which the data signal will be communicated; and upon reception of the signal communicating the data rate at which the data signal will be communicated, instruct the switch to cease iterative coupling;

wherein the signal communicating a data rate at which the data signal will be communicated is a two-bit digital signal with each bit being carried on a separate line derived by the tri-state converter from a tri-state signal provided by the physical interface.

15. The media converter of claim 14, wherein the logic device is further arranged to:

receive a signal from the physical interface, the signal communicating that a period during which the data signal will be at least partially absent is ensuing;

wait for the period during which the data signal will be at least partially absent to expire;

receive a signal from the physical interface, the signal communicating a data rate at which the data signal will be communicated; and upon reception of the signal communicating the data rate at which the data signal will be communicated, instruct the switch to cease the iterative coupling.

16. The media converter of claim 15, wherein the period during which the data signal will be at least partially absent to comprises an autonegotiation period.

17. The media converter of claim 14, wherein the logic device is a microprocessor.

18. The media converter of claim 14, wherein the logic device is an application specific integrated circuit.

19. The media converter of claim 14, wherein the first medium comprises a metallic conduction path.

20. The media converter of claim 14, wherein the second medium comprises an optical fiber.

21. The media converter of claim 14, wherein the first medium comprises an optical fiber.

22. The media converter of claim 14, wherein the second medium comprises a metallic conduction path.

23. A media converter comprising:

a switch having a first end and a second end, the first end capable of coupling to any of a plurality of potential sources of a data signal, the second end coupled to an input port of a physical interface that converts the data signal from a signal that propagates along a first medium to a signal that propagates along a second medium;

at least one biasing switch enabling directional connection between the physical interface and the plurality of potential sources;

an optical transceiver coupled to the physical interface;

a tri-state converter configured to convert a tri-state signal provided by the physical interface to a two-bit digital signal with each bit being carried on a separate line, the two-bit digital signal identifying a data rate at which the data signal will be communicated; and a programmable logic device to control the switch so as to couple the input port of the physical interface to one of the plurality of potential sources actually carrying a data signal;

wherein the physical interface detects a data rate of the data signal.

24. A network arrangement comprising:

a media converter including:

a switch having a first end and a second end, the first end capable of coupling to any of a plurality of potential sources of a data signal, the second end coupled to an input port of a physical interface that converts the data signal from a signal that propagates along a first medium to a signal that propagates along a second medium;

a least one biasing switch enabling a directional connection between the physical interface and the plurality of potential sources;

an optical transceiver coupled to the physical interface;

a tri-state converter configured to convert a tri-state signal converted by the physical interface to a two-bit digital signal, with each bit being carried on a separate line, communicating a data rate at which the data signal will be communicated;

a programmable logic device to control the switch so as to couple the import port of the physical interface to one of the plurality of potential data sources actually carrying a data signal;

wherein the physical interface detects a data rate of the data signal;

a first network device coupled via the first medium to the switch within the media converter; and a second network device coupled via the second medium to the optical transceiver within the media converter.

25. The network arrangement of claim 24, wherein the first network device comprises a switch.

26. The network arrangement of claim 24, wherein the first network device comprises a hub.

27. The network arrangement of claim 24, wherein the first network device comprises a workstation.

28. The network arrangement of claim 24, wherein the first medium is a metallic conductor.

29. The network arrangement of claim 24, wherein the second medium is an optical fiber.

30. The network arrangement of claim 24, wherein the first medium is an optical fiber.

31. The network arrangement of claim 24, wherein the second medium is a metallic conductor.

* * * * *